United States Patent [19]

Ayers et al.

[11] 4,170,911
[45] Oct. 16, 1979

[54] LOG CUTTING APPARATUS

[75] Inventors: Thomas A. Ayers; Peter T. Ayers, both of Sumter, S.C.

[73] Assignee: Forest Products Industrial Designs, Inc., Sumter, S.C.

[21] Appl. No.: 671,587

[22] Filed: Mar. 29, 1976

[51] Int. Cl.² .......................... B26D 7/02; B26D 7/18
[52] U.S. Cl. ........................................ 83/104; 83/157; 83/160; 83/119; 83/217; 83/268; 83/282; 83/391; 83/466.1; 83/467 R; 83/485; 83/522; 144/312; 198/345; 198/368; 414/15; 269/307
[58] Field of Search ................ 83/158, 159, 160, 102, 83/104, 119, 120, 155.1, 157, 212, 268, 269, 391, 282, 288, 452, 467, 466.1, 468, 485, 486, 487, 488, 489, 490, 522; 144/2 R, 3 R, 312; 198/345, 339, 368; 214/1.2, 1.3, 1 P; 269/25, 307, 265, 295, 321 N

[56] References Cited

U.S. PATENT DOCUMENTS

| 260,777 | 7/1882 | Patton | 269/265 |
|---|---|---|---|
| 632,640 | 9/1899 | Butterfield | 83/119 |
| 2,517,431 | 8/1950 | Hildebrand et al. | 269/25 |
| 2,801,560 | 8/1957 | Spangler | 269/265 X |
| 2,849,907 | 9/1958 | Moosman | 269/25 |
| 3,398,774 | 8/1968 | Hahn | 144/2 Z |
| 3,580,306 | 5/1971 | Tanguay | 83/119 X |
| 3,759,124 | 9/1973 | Bashor | 83/119 X |
| 3,813,980 | 6/1974 | Rand et al. | 83/391 |
| 3,834,260 | 9/1974 | Sievrin | 83/288 |
| 3,841,462 | 10/1974 | Schmidt | 198/339 |

FOREIGN PATENT DOCUMENTS 2416703 5/1974 Fed. Rep. of Germany ........... 198/345

Primary Examiner—Robert L. Spruill
Assistant Examiner—W. D. Bray
Attorney, Agent, or Firm—Luke J. Wilburn, Jr.; Wellington M. Manning, Jr.

[57] ABSTRACT

Apparatus is disclosed and claimed herein for cutting logs into predetermined lengths with primary use in a hardwood veneer plant. A log conveyor is provided, preferably in two sections, with a cutting station located therebetween. The cutting station is equipped with a pivotally operated chain saw or circular saw which cuts the logs as desired. A log clamp means is provided immediately adjacent the cutting station to engage the log on two sides, preferably top and bottom, with the diameter of the log being irrelevant within wide ranges. When a log is first clamped, the cutting saw passes to square off the forward end of same. Located downstream of the cutting station are a plurality of individually operated log stops that are located in the path of travel of the log moving along the conveyor. A particular stop, depending upon the length of log cut desired, is actuated to move into the path of log travel. Upon engaging the stop, log travel ceases, the clamp means are actuated to hold the log, and the cutting saw makes a pass to cut the log. A cut block of a predetermined length is produced. A graduated scale which automatically indicates the diameter of the log being cut may be associated with the clamp means to determine the board feet of cut blocks in a given period of time. A further preferred embodiment includes kick members adjacent the cutting station to forceably remove waste thereat. Downstream of the cutting station is a cut block kick member which is actuated by impact of the cut block at a second stop means. A method of cutting blocks of a predetermined length is also described and claimed herein.

21 Claims, 8 Drawing Figures

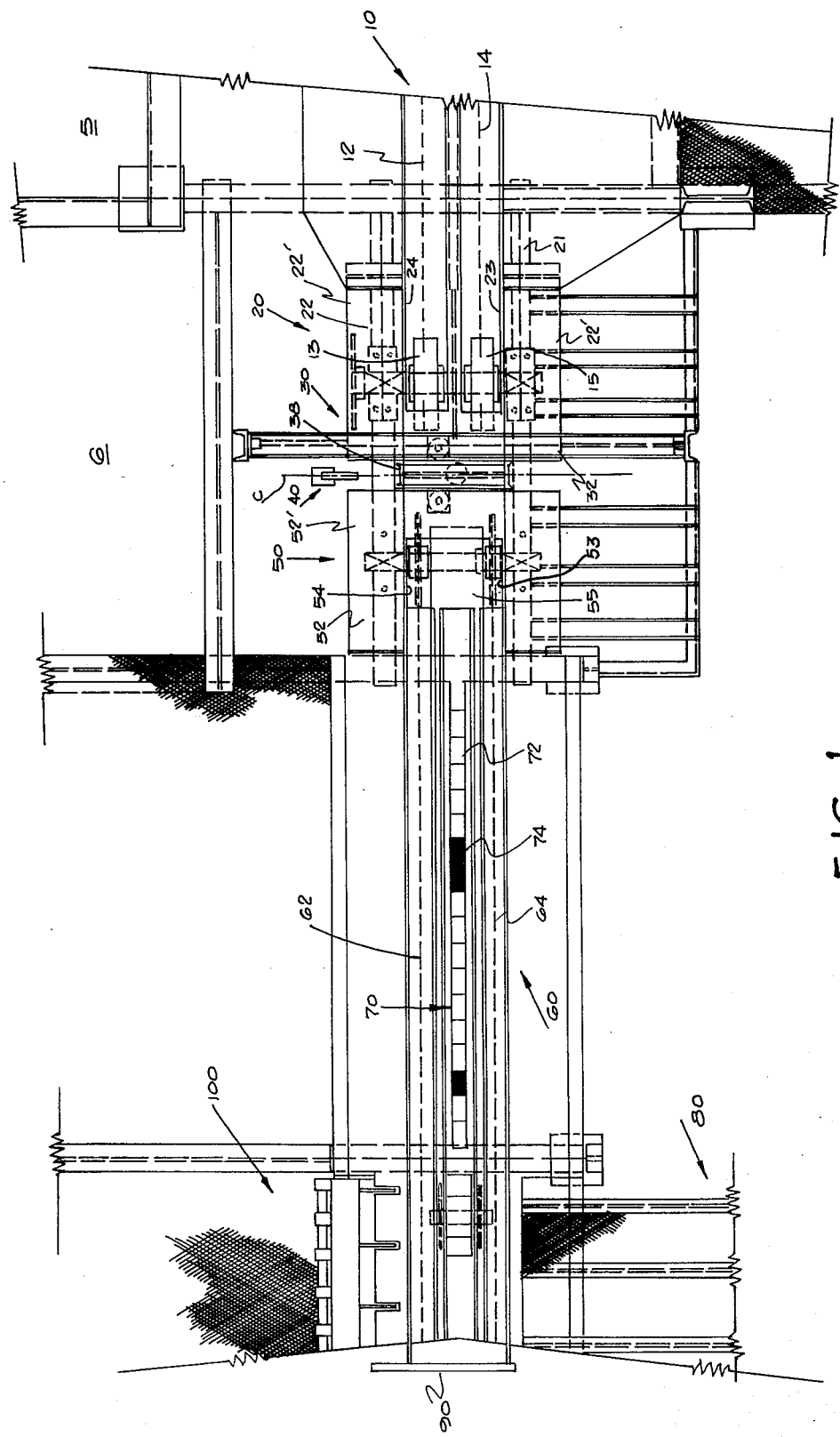

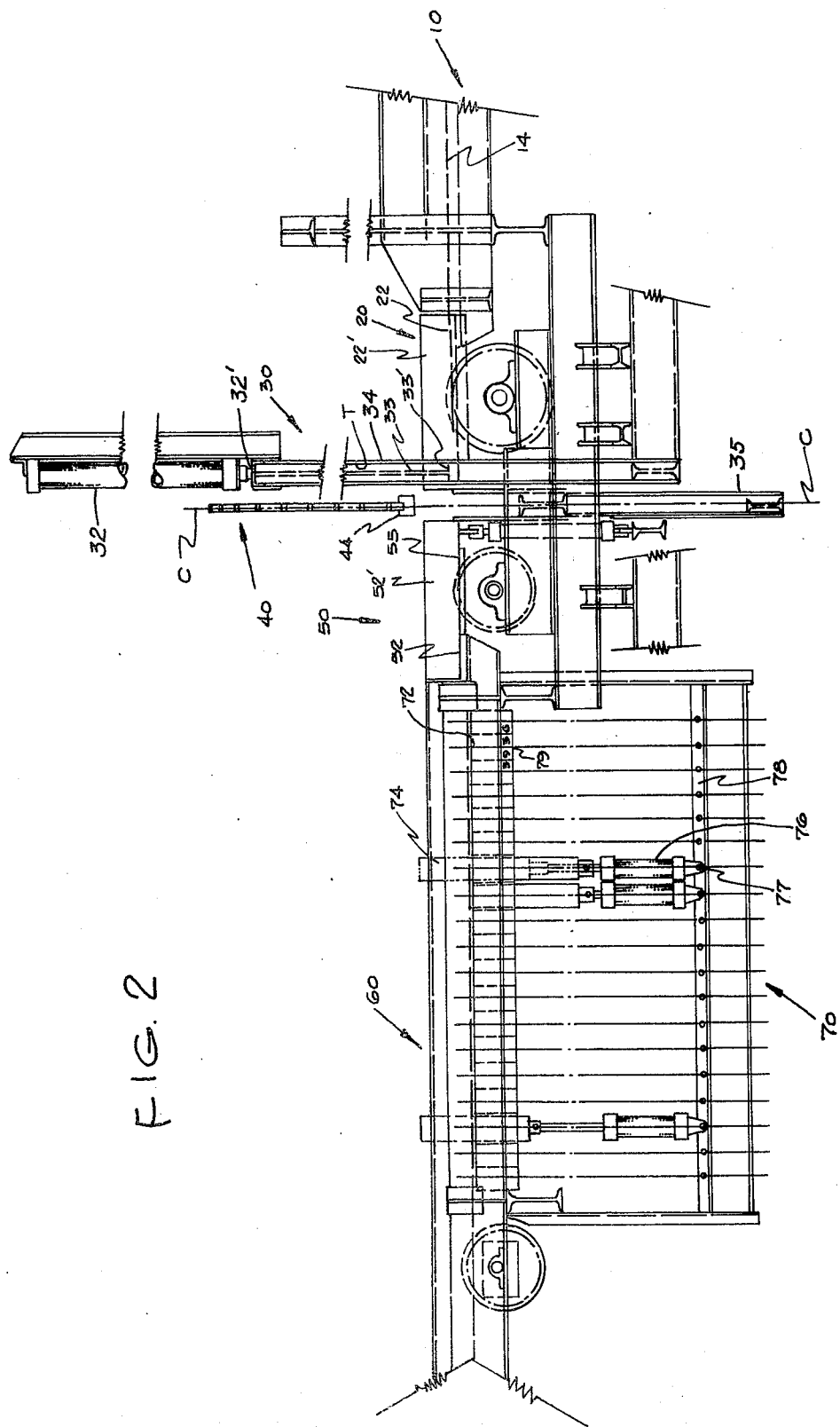

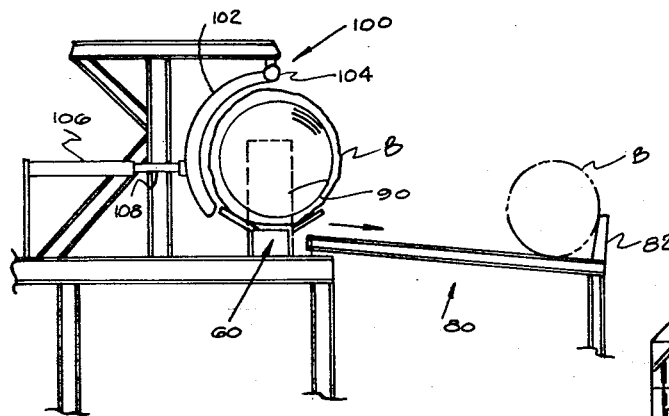
FIG. 6
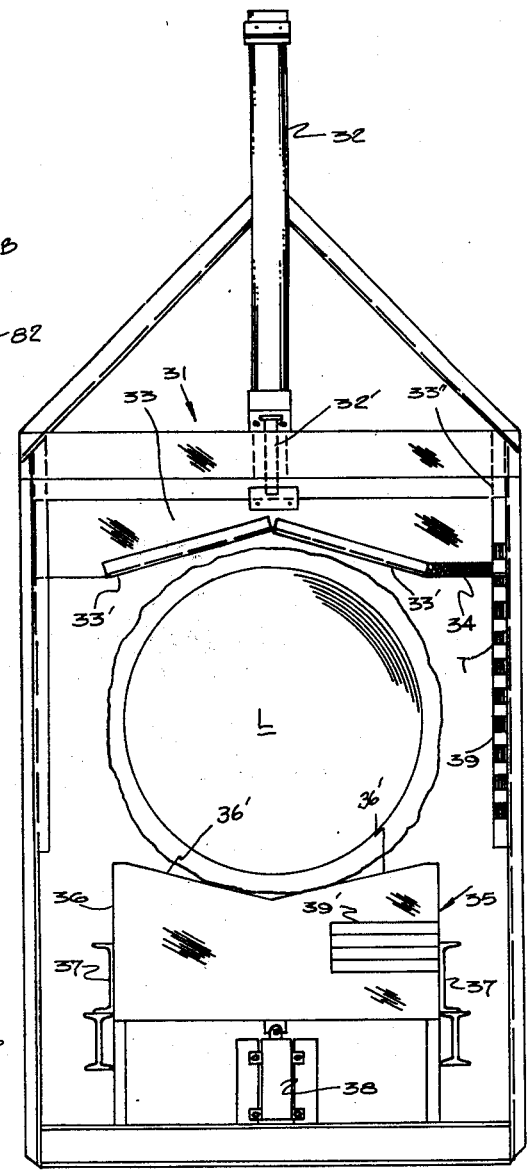
FIG. 4A
FIG. 4
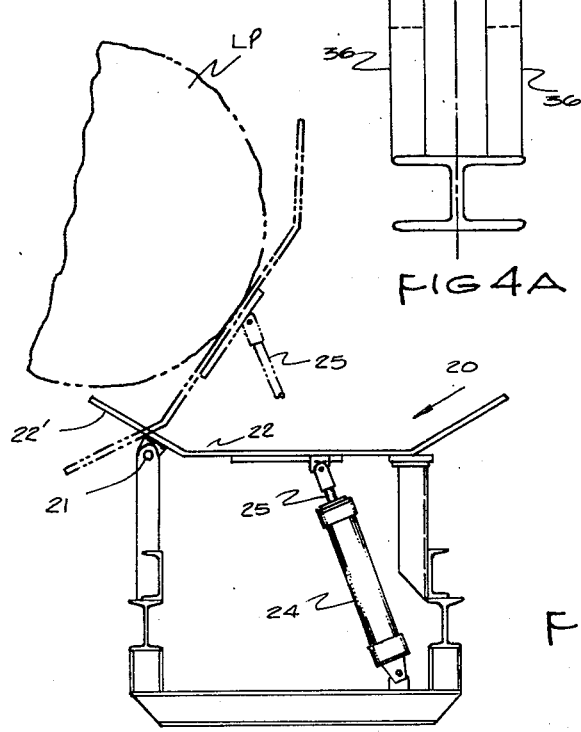
FIG. 5

LOG CUTTING APPARATUS

BACKGROUND OF THE INVENTION

In a saw mill environment where cut timber is delivered for further processing, a situation generally exists where manual labor is employed to physically handle and cut the timber into particular log or block lengths. Use of such labor, is problematical due to large numbers of laborers required, dependability of attendance, safety of the laborers, consistency of product, and very importantly, variance as to amounts of board feet for a particular type wood that has been cut.

In a hardwood veneer mill the timber or logs are cut into blocks of a predetermined length; treated; and subsequently placed on large lathes where they are individually cut into continuous thin strips that are used in producing veneer. It is very important to ascertain board footage of a particular type of wood that will be used to produce a hardwood veneer. Historically, the hardwood blocks have been cut at a length and a manual laborer has been utilized to manually measure the diameter of the log with a rule and record the diameter of same such that the board footage of the particular block can be calculated. Since a mill cuts many different kinds of orders each normal working day, a more efficient method of handling and of calculating board footage would be very desirable. Likewise, handling of the cut blocks has been manual from the standpoint of removal of the blocks from the saw or other cutting means and individual transportation or almost individual transportation of the blocks by a forklift to the processing area where the blocks are steamed and conditioned for cutting into continuous strips from which veneer is produced.

Further problems have existed in the industry directed to the removal of waste or scrap portions of logs that result during the block cutting operation at both ends and sometimes in the middle of a log being cut. Historically, these waste log portions have been manually removed from around the cutting area to permit the next cutting operation to be conducted. Again, manual labor has been utilized to perform this function, and tremendous safety problems are apparent.

The present invention provides a system for efficiently and economically handling particularly hardwood logs for the production of blocks from which hardwood veneer is produced. The present system represents a tremendous advance in the art, in that, better quality control is maintained, substantially less labor is involved, production rates are increased tremendously, and the operation is substantially safer than prior systems.

SUMMARY OF THE INVENTION

It is an object of the present invention to provide a system for cutting logs to produce blocks of a predetermined length.

Another object of the present invention is to provide a system for cutting blocks from logs for a hardwood veneer mill while board footage of same can be quickly determined.

Still another object of the present invention is to provide a unique system for cutting blocks of a predetermined length and for handling scrap remains and the cut blocks in an efficient fashion.

Another object of the present invention is to provide a unique means for clamping a log adjacent a cutting station while simultaneously determining the diameter of the portion of the log being cut.

Yet another object of the present invention is to provide a novel and improved method for cutting logs into blocks of predetermined lengths.

Generally speaking, the log cutting apparatus of the present invention comprises conveyor means for transporting logs to be cut; log clamp means located along said conveyor, said clamp means holding said log during cutting; power cutting means adjacent said log clamp means, said cutting means being moveable across said log to sever same, stop means positioned along said log conveyor means downstream of said cutting means, said stop means determining a predetermined length of a block to be cut from said log.

More specifically, the log cutting apparatus of the present invention is designed to receive a log that has been previously debarked. The debarked log falls onto a moving conveyor or log haul and is transported to a cutting station. At the cutting station, the clamp means, preferably an upper and lower clamping member, both of which possess bifurcated members to receive logs of various diameters, are provided and are operable to move into and out of engagement with a log to be cut. If the forward end of the log is not square, the clamp means are actuated and move into contact with the log to hold the same adjacent a forward end. Once the clamp means are in place against the log and the log is secured, the cutting means, preferably a bucking saw, is brought across the log, cutting same to provide a square forward end. Thereafter, the log scrap also referred to as a "lilly pad", that has been cut to provide the square end, is kicked away from the cutting area by an air operated or otherwise operated kicking member. Once the lilly pad is moved away from the cutting area, the clamps are withdrawn and the log is free to move, being transported by the conveyor downstream of the cutting station. A log stop is positioned at a predetermined distance from the cutting station and is contacted by the log to stop same. Once the log is stopped, the clamp means are again actuated to come into contact with the top and bottom of the log and hold same, and the saw is actuated and passes across the log to sever same and produce a block of a length determined by the distance between the cutting means and the log stop. Thereafter, the cut block is transported to a block treating station. In a preferred embodiment, a downstream conveyor is provided that transports the cut block away from the cutting station after the log stop has been moved from the path of log travel. The log is then transported to a collection point where a second or block stop-kick switch stop is engaged. Upon engagement, the block stop actuates a block kicker which pivots into the position where the block resides and forces same away from the log path to a block collection point where a plurality of cut blocks can be received and later removed by a forklift or other means.

Clamp means for holding the log adjacent the cutting station, as mentioned above, include a pair of oppositely positioned bifurcated legs that receive logs of various diameters. In a preferred arrangement one clamp member is vertically offset from the other. Each clamp member thus operates in a separate vertical plane, different from the vertical plane of the other. Furthermore, in a preferred arrangement, a graduated scale is provided adjacent the clamp means such that when the clamp members are actuated and come into contact with a log to hold same for cutting, an element of one of the clamp members moves along the graduated scale and indicates the diameter of the block to be cut. In certain circumstances where a crooked log is being cut, and where the bottom clamp member moves upwardly beyond zero point on the graduated scale, a further graduated scale is provided beneath the lower clamp member to register an amount that should be subtracted from the direct reading of the main graduated scale to achieve the diameter of the log being cut.

At the forward and rearward ends of logs being cut, scrap material is generally produced which must be removed from the path of log travel so as to not interfere with the normal operation. These lilly pads, as mentioned above, have been historically removed by hand. According to the present invention, however, lilly pad kickers are employed, preferably on both sides of the cutting station. The lilly pad kickers are pivotally mounted adjacent the conveyor and may be operated by hydraulic or air cylinders. Once a lilly pad is produced, same normally resides on one of the lilly pad kickers. Actuation of the lilly pad kicker will then cause the kicker to pivot about its support and physically throw the lilly pad out of the area of the conveyor and cutting station. In like fashion at the end of the system a block kicker is actuated upon contact with the block stop to kick the cut blocks out of the path of block travel onto a block collection platform. After several blocks have accumulated, a forklift can then carry the group of blocks to a conditioning room where the blocks are conditioned for later slicing into veneer.

Immediately adjacent the cutting station on the downstream side are a plurality of vertically moveable individually adjustable stops, one of which is actuated at a time to be forced upwardly into the path of log travel to physically impede travel of a log therebeyond. Once the log stops, a predetermined length of log has been provided on the downstream side of the cutting station. The saw can then be actuated to move across the log and cut same whereby a block of predetermined length has been produced. At the same time, the reading from the graduated scale of the clamp member will determine the diameter of the log. These dimensional numbers can then be used to calculate the board footage of the block cut.

Since blocks of different lengths are desired in normal daily operation, a plurality of stops may be provided. To further increase versatility of the system, a graduated scale may be provided beneath the conveyor such that the individual stops may be positioned at different predetermined length increments away from the cutting station. In a preferred arrangement, approximately six of these stops are employed at different lengths, and the operator of the system may then actuate any one of the stops as desired to provide a cut block of a length for the particular stop.

In practicing the method according to the teachings of the present invention, the general steps to be followed include: providing a log with a leading end at least substantially square; conveying a portion of said square end log through a cutting station; engaging said squared log a predetermined distance from said cutting station with stop means; clamping said log adjacent said cutting station; cutting said log while said log is clamped; removing said stop means from a path of travel of said log; and removing said cut log away from said cutting station.

BRIEF DESCRIPTION OF THE DRAWINGS

FIG. 1 is a plan view of the log cutting apparatus of the present invention.

FIG. 2 is a side elevational view of the log cutting apparatus according to the present invention.

FIG. 4 is a cross sectional view of the log cutting apparatus according to the present invention.

FIG. 4-A is a side elevational view of a portion of the log clamp means of the present invention.

FIG. 5 is a cross sectional view of a portion of the log cutting apparatus according to the present invention showing lilly pad kickers in detail.

FIG. 6 is a partial end view of apparatus of the present invention illustrating the block kicker in more detail.

DESCRIPTION OF THE PREFERRED EMBODIMENTS

Figure 3:
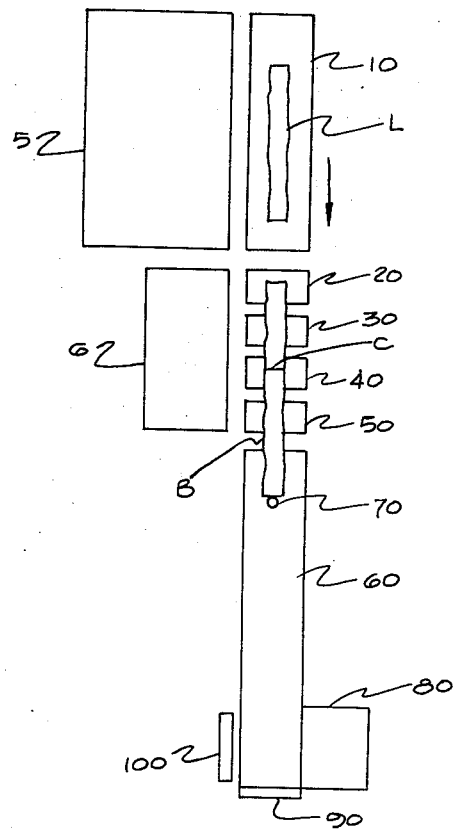
FIG. 3 is a schematic diagram of the apparatus of the present invention.

Making reference to the Figures, preferred embodiments of the present invention will now be described in detail. In FIGS. 1, 2 and 3, the overall apparatus of the present invention is set forth. FIG. 3, for example, schematically illustrates a preferred arrangement of the apparatus of the present invention, wherein a first conveyor generally indicated as 10 is provided for receiving logs L from a debarker 5, transporting the logs in the direction of the arrow. In a most preferred embodiment, the apparatus of the present invention is controlled and operated from a control house 6 which is located intermediate the length of the apparatus and positioned above the same such that an operator can visually observe the operation in progress, and actuate the various controls for performing the particular intended functions. As log L moves down conveyor 10, it first crosses a lilly pad kicker 20 and log clamp station 30 into the vicinity of power cutting means 40 and downstream lilly pad kicker 50. Subsequent to lilly pad kicker 50 is a second conveyor 60 and a bank of log stop means 70. Adjacent the terminal end of second conveyor 60 is a platform 80, a block stop-switch 90 and a block kicker 100.

The general operation and method of the present invention thus proceeds as follows. A log is first debarked at debarker unit 5, which does not form a part of the present invention. After being debarked, the log is presented on conveyor 10 to be moved in the direction of the arrow. Once the forward end of the log L has passed just beyond power cutting station 40, clamp means 30 are actuated to grab and hold log L very rigidly in place. Power cutting unit 40 is then actuated and is brought across log L to sever the forward end of same and provide a square cut across the end of log L. The cutaway forward portion of log L is a lilly pad, which once severed from log L, rests on lilly pad kicker 50. The operator then actuates lilly pad kicker 50 whereby kicker 50 throws the previously cut lilly pad away from the processing line for later removal. Clamp means 30 is then deactuated and log L is conveyed downstream until it engages one of the banks of log stop means 70 that has been actuated to extend upwardly through second conveyor 60. Stop 72 impedes any fruther movement of log L and has been preset to provide a predetermined distance between cutting station 40 and stop 72. Once log L is stopped, clamp means 30 is again actuated to rigidly hold log L in position, after which the cutting means 40 are again actuated to come across log L to sever same along a line C. The portion of log L between cutting station 40 and stop 72 is then referred to as a block B. After the cut has been performed, stop 72 is retracted, clamp means 30 releases log L and log L and the block B proceed downstream along the apparatus. The block B is conveyed in the direction of the arrow along the length of second conveyor 60. At the end of conveyor 60, block B engages a stop-switch combination 90. Upon engagement of stop-switch 90, block kicker 100 is actuated and kicks the block away from the discharge end of conveyor 60 onto platform 80 from where block B will eventually be moved to a conditioning station for further processing.

Simultaneously with the removal of block B from the cutting station, log L begins movement again in the downstream direction of the apparatus. As soon as block B passes the particular stop of stop bank 70, the particular stop is again actuated and extends upwardly from conveyor 60 to engage the oncoming end portion of log L. The cycle is then repeated until log L is consumed. Generally speaking, after the last cut of a block from log L, the remaining portion of log L is also waste and is also referred to as a lilly pad. This waste portion of log L resides on lilly pad kicker 20. Once it becomes evident that the lilly pad exists, after the last cut from log L, lilly pad kicker 20 is actuated to throw the lilly pad from the conveyor line onto a waste pile.

Making particular reference to FIGS. 1 and 2, specific apparatus of the present log cutting system will now be described in detail. The log debarking unit 5 which, as mentioned above, does not form a particular part of the present invention, is generally located adjacent the first conveyor 10 as illustrated in FIG. 1. On the debarking unit, logs cut from a forest are received in a cradle or the like where the bark is ground therefrom along substantially the entire length of same. The debarked log then rolls down onto conveyor 10 where it rests between conveyor chains 12 and 14 that run continuously around drive wheels 13 and 15 at one terminal end of the conveyor and another pair of drive wheels (not shown) at the beginning of the conveyor. Conveyor 10 thus receives a log thereon and chains 12 and 14 transport the same in the direction of the arrow for further handling.

The physical layout of the present invention further includes an operations house 6 that is preferably located intermediate the length of the apparatus at a level sufficiently high to permit an operator therein to visually observe each of the operations taking place. As such, the operator can actuate the various elements to perform the intended functions. A log being transferred by conveyor 10 first passes a lilly pad kicker 20 that is pivotally mounted for movement to dislodge lilly pads from conveyor 10. Lilly pad kicker 20 comprises a plate 22 having openings 23 and 24 extending from one end which permit log chains 12 and 14 to operate along a substantial length of kicker 20. Outer edges 22' of lilly pad kicker plate 22 are turned upwardly as shown in particular in FIG. 2 to cradle a lilly pad therein such that, once the kicker is actuated, the lilly pad will be directed from the processing line in a proper fashion. Located at the downstream end of lilly pad kicker 20 is the log clamp means 30 which generally comprises an upper clamp member 31 and a lower adjacent clamp member 35. The log clamp means 30 will be described in more detail hereinafter.

Lower clamp member 35 moves upwardly beneath a log L to support same thereat. Intermediate lower clamp member 35 is the cut line C along which logs will be severed by power cutting means 40, which functions only when log clamp means 30 has been actuated to securely hold the log for the cutting operation. Immediately downstream of cutting means 40 and lower clamp member 35 is a second lilly pad kicker generally indicated as 50. Lilly pad kicker 50 is designed in similar fashion to lilly pad kicker 20, in that, openings 53 and 54 are provided to receive log chains 62 and 64 of a second conveyor 60 therein. Furthermore, the outer edges 52' of lilly pad kicker plate 52 are likewise tilted upwardly to cradle a lilly pad therein. A center plate 55 of lilly pad kicker 50 located between openings 53 and 54 is dropped below the level of plate 52 as is best illustrated in FIG. 2. Lowering of middle plate 55 permits blocks that are cut from logs by cutting means 40 to fully engage conveyor chains 62 and 64 and be transported away from the cutting station.

A bank of stop means generally indicated as 70 is located along conveyor 60, preferably between chains 62 and 64. Stop means 70 comprises a plurality of adjacent openings 72 extending lengthwise a portion of the distance along conveyor 60. Stop elements 74 are then received in certain of the openings 72 for up and down movement therethrough. Referring particularly to FIG. 2, it is seen that each stop element 74 is secured at a lower end to an air cylinder or the like 76 with the lower end of the cylinder 76 being secured to a particular pin 77 located along a support structure 78. A tab 79 may also be located along the length of stop means 70 and carries indicia indicating the distance from the cutting line C to the front edge of a stop element 74 received in the particular opening. As such, stop element 74 and cylinder 76 may be set as desired along the length of stop means 70 to provide a predetermined distance between the stop element 74 and the cutting line and thereby permit cutting of a block of a particular length. As further shown in phantom in FIG. 2, a first element 74 is illustrated in a raised position which would permit engagement with a log L at that point when one is transported thereto by conveyors 10 and/or 60. Furthermore, as mentioned hereinbefore, a number of stops 74 may be provided at any one time located at different positions along the length of stop means 70. With the particular stop means 74 being in the up position and halting transport of a log along conveyor 60, the clamp means 30 is actuated and the saw means 40 pivots around its pivotal mounting 44, across the log, cutting the same along cutting line C. Thereafter, pressure in the particular cylinder 76 is relieved and stop element 74 falls from the path of log travel, permitting the block B to be further transported along conveyor 60. At the end of conveyor 60 and adjacent same is a platform generally indicated as 80 which receives the blocks in a manner hereinafter described.

As the block B reaches the terminal portion of conveyor 60, a block stop-switch means 90 is engaged thereby. Upon engagement, the switch segment of stop 90 actuates a block kick means generally indicated as 100 which moves forward and knocks cut block B onto platform 80 where block B rolls to an end of same. Once an appropriate number of blocks reside at the lower end of platform 80, they may then be collectively transported in proper fashion, such as by a forklift, to further processing. It should be understood that the block stop may be separate from the switch means that are used to actuate block kicker 100.

Making reference to FIG. 4, further particulars of the clamp means 30 will be described. A suitable framework is provided from which the upper clamp member 31 is suspended and which supports the lower clamp member 35. Upper clamp member 31 includes a source of power such as an air cylinder 32 that is appropriately secured to the framework and has a plunger 32' that is extendible outwardly from the same. Plunger 32' is secured at an outer end to a plate 33 that has a pair of bifurcated flanges 33' being secured thereto. The outer edges 33" of plate 33 reside in a trackway T that is vertically positioned in a proper plane along the framework. Plate 33 has a further portion 34 along one side thereof that preferably is painted a brilliant color and serves as the indicator along graduated scale 39 that is vertically positioned on the framework. Indicator 34 will, under most circumstances, directly read the diameter of a log being cut by its relative position along graduated scale 39.

Lower clamp member 35 is vertically offset from upper clamp member 31 as is best seen in FIG. 2. Lower clamp member 35 comprises a pair of plates 36 (See FIG. 4-A), the upper portion which have a pair of bifurcated edges 36' which will accept logs of varying diameters. Plates 36 are received between a pair of vertical supports 37 which define a vertical track therefor. The underside of plate 36 is secured to a hydraulic cylinder 38 or other source of power for raising and lowering same into and out of contact with the bottom of a log L. Plate 36 further has a series of graduated lines 39' inscribed along one side thereof. Graduated lines 39' become visible only when plate 36 is raised above the lower level of graduated scale 39. Graduated lines 39 thus are used in determination of the diameter of a log being cut and the number of lines 39' that become visible during upward raising of plate 36 are substracted from the indicated diameter on graduated scale 39 to determine the actual diameter of a log being held thereat. As mentioned above, plates 36 are spaced apart on a suitable support member with the log cut line C being located therebetween. As such, during the cutting operation, the log L receives support on both sides of the cutting means 40.

Lilly pad kickers 20 and 50 are shown in more detail in a side view in FIG. 5. The lilly pad kicker prior to the cut line C will be described in particular, though it should be understood that with the exception of the depressed plate 55, both lilly pad kickers 20 and 50 are similarly designed and function in the same fashion. Kicker plate 22 is shown pivotally supported at a rod 21 on the underside of the upwardly extending portion 22' thereof and loosely supported at an opposite end thereof by the framework for the apparatus of the present invention. Located beneath the bottom of plate 22 is a cylinder 24 which is appropriately secured to plate 22 at one end of a piston rod 25 received therein and at an opposite end to the framework for the system of the present invention. When, due to operation of the present invention, a lilly pad LP shown in phantom, rests on the stationary lilly pad kicker 20, it becomes desirable to dispose of same. The operator then actuates cylinder 24 whereupon as shown in phantom, rod 25 extends from cylinder 24, causing plate 22 to pivot about its pivot point at rod 21 and force lilly pad LP away from the normal path of log travel. Thereafter, pressure is released in cylinder 24 and lilly pad kicker plate 22 returns to its rest position as shown in solid lines in FIG. 5.

FIG. 6 shows a partial end view of the log cutting line according to the present invention being simplified to particularly describe the block kicker 100. A block B being transported along conveyor 60 engages block stop-switch means 90. Block kicker generally indicated as 100 comprises an arcuately shaped member 102 that is pivotally supported about a pivot point 104 and suspended therefrom. Once block B makes contact with block stop-switch means 90, an air cylinder or the like 106 is actuated which causes a rod 108 that is received therein, and an outer end of which is secured to a rear side of kick member 102, to be forced outwardly. The outward force causes kick member 102 to physically force block B from conveyor 60 whereupon, block B falls on inclined platform 80 and rolls downwardly until an upwardly extending edge 82 is engaged or a block B is engaged. The blocks then remain on platform 80 until such time as it is desirable to remove them to the conditioning room for further processing.

Figure 7:
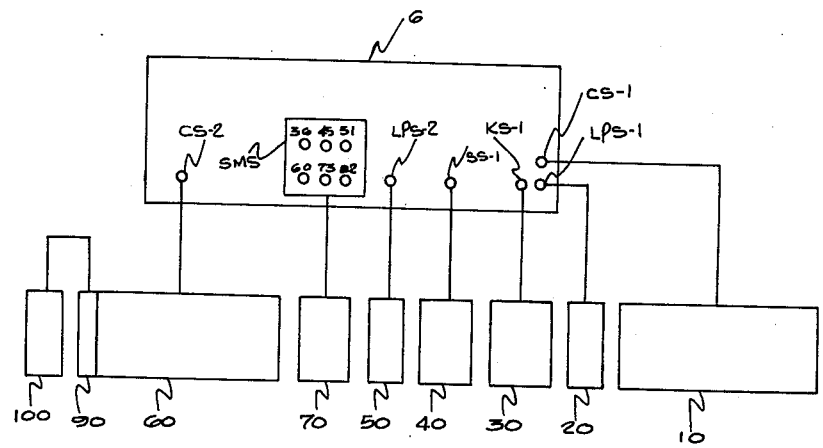
FIG. 7 is a schematic diagram of the switch arrangements for actuating the various components of the apparatus of the present invention.

FIG. 7 is a schematic illustration of the operative connections between the various operative stations in the apparatus according to the present invention. As mentioned above, an operator is located in a structure 6 which preferably is raised above the level of the system of the present invention. In the operator house 6, the operator is provided with suitable instrumentation that is electrically connected to the apparatus as follows. In starting up the operation, a debarked log is received on conveyor or log haul 10. The operator then depresses switch means CS1 to start the conveyor and initiate transportation of the log through the process. Once a forward end of the log has passed the cutting station, the operator stops conveyor 10 by appropriate deactuation of same at switch CS1, actuates clamping means 30 by depressing switch means KS1 which causes cylinders 32 and 38 to bring clamp members 31 and 35 respectively, into contact above and beneath log L. While the clamps have log L secured, the operator then depresses switch means SS1 to actuate the cutting means and cause the buck saw to pass across the forward end of log L severing a small lilly pad from log L to square the end of same. Obviously, if the forward end of log L has previously been squared, this operation is not necessary. If a lilly pad is produced, however, the operator then depresses switch means LPS-2 which actuates lilly pad kicker 50 and throws the previously produced lilly pad from the path of log travel.

In a preferred embodiment, the operator has before him a panel of switches SMS that are operatively associated with stop means 70. Each of the switches (6 are shown) may have a numerical block length inscribed over same on Plexiglas or some other material that may be changed on a daily basis. The various numbers inscribed over the switches are correlated to particular stop element 74 located in openings 72 that correspond in distance to the number from cutting line C. For example, if a stop element is desired at 36 inches to produce a block 36 inches in length, switch means SMS having 36 inscribed thereabove, is depressed. The stop element cylinder 76 corresponding to the element 74 in the 36 inch opening, is actuated and causes the appropriate stop element 74 to raise into the path of log travel along conveyor 60. Once stop element is in the log path, clamp means 30 are deactuated at switch KS1 and conveyor 10 is restarted at switch CS1 to cause log L to move along the system until contact is made with stop element 74 at the 36 inch position. At that point, conveyor 10 is deactuated at switch CS1, clamping means 30 is again reactuated at switch KS1 and the cutting means 40 is reactuated at switch SS-1 to cut a 36 inch block from the log. Once the cut has been made, stop element 74 at 36 inches is deactuated by the appropriate SMS switch, whereby element 74 falls back to an inoperative position, out of the path of log travel. Clamp means 30 is deactuated and conveyor 10 is restarted along with conveyor 60. The cut block B is then conveyed away from the cutting station.

As soon as the block B has been conveyed beyond the appropriate stop element, the stop element, e.g., at 36 inches, is reactuated to raise element 74 back into the path of log travel to engage the now forward end of log L. Once contact has been made, the cycle is repeated until all of the possible number of blocks have been cut from log L. In all likelihood, an odd length of log L will remain on the upstream side of the cutting means 40 and become a lilly pad. Should such eventuality occur, switch LPS-1 is made operational to actuate lilly pad kicker 20 and force the remaining portion of log L out of the path of travel. The overall cycle is then repeated with a new log L.

At the end of block travel along conveyor 60, block stop-switch means 90 is engaged which automatically actuates block kicker 100 and causes same to propel block B away from conveyor 60 and onto platform 80. In the above fashion, a single operator may stay in the operator house 6 and perform the various functions described above.

In describing the method and apparatus of the present invention, reference has been made in general to air cylinders as means of operating the various kickers and clamp means. Obviously, any motive power source that would be suitable according to the present arrangement may be utilized. Additionally, the structural necessities of the present invention require substantial framework due to the weight and size of logs being handled, conventionally in a range of 10 to 50 inches in diameter. Furthermore, an automatic counter may be associated with each stop cylinder 76 to automatically register the number of blocks cut for the particular length at which the stop is set.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. Improved log cutting apparatus comprising:
   (a) first conveyor means for transporting logs to be cut;
   (b) log clamp means located adjacent an end of said first conveyor means, said clamp means comprising a first bifurcated member located below a log to be cut and a second befurcated member located above a log to be cut, said first and second bifurcated members being moveable to clamp a portion of a log therebetween;
   (c) power cutting means located adjacent said clamp means, said cutting means being moveable across said log to sever same;
   (d) pivotal waste removal means located adjacent said power cutting means; said waste removal means lying beneath a log path of travel and being pivotal upwardly to remove cut log waste from the apparatus;
   (e) second conveyor means located on an opposite side of said power cutting means to said first conveyor means; and
   (f) a plurality of individual log stop means located along said second conveyor means and being individually actuatable to stop a log moving along said second conveyor means at a predetermined location to cut a predetermined length of log.

2. Log cutting apparatus as defined in claim 1 wherein said pivotal waste removal means comprise a pivotal member located on each side of said power cutting means, said waste removal means being individually actuatable to remove waste from either side of said power cutting means.

3. Log cutting apparatus as defined in claim 1 wherein said log clamps are shaped to partially conform to the contour of logs of different diameters, said clamps being vertically offset from each other.

4. Log cutting apparatus as defined in claim 1 wherein further said log clamp means has a graduated scale in conjunction therewith, said scale indicating the diameter of a log being held therein.

5. Log cutting apparatus as defined in claim 1 wherein said power cutting means are mounted adjacent said clamp means, said cutting means being operable to pass across said conveyor means and sever said log thereat.

6. Log cutting apparatus as defined in claim 1 wherein said stops are operated by air cylinders.

7. Log cutting apparatus as defined in claim 1 wherein said waste removal means includes a waste removal means located upstream and downstream of said power cutting means along said log path of travel.

8. Log cutting apparatus as defined in claim 1 comprising further cut block removal means located downstream of said stop means, said cut block removal means being operable to move across said log path and remove cut blocks therefrom.

9. Log cutting apparatus as defined in claim 8 wherein said cut block removal means is operated by an air cylinder and is actuated by switch means engaged by said cut block.

10. Improved log cutting apparatus comprising:
   (a) first log conveyor means for transporting logs to be cut;
   (b) log clamp means located adjacent an end of said first conveyor means, said clamp means comprising a pair of clamp members, a first of said members being moveable into and out of engagement with an underside of a log and a second of said members being vertically offset from said first and being moveable into and out of engagement with an opposite side of said log;
   (c) power cutting means located adjacent an end of said first conveyor, said cutting means being moveable across a log path along said conveyor to sever said log thereat;
   (d) kick means adjacent said power cutting means to remove log waste remaining thereat;
   (e) a second log conveyor located adjacent said cutting means on a downstream side and extending away from same to deliver blocks cut from said log; and
   (f) a plurality of raiseable log stop means located within said second conveyor at a predetermined distance from said cutting means, said stop means being individually raised to stop log movement along said conveyor for cutting and then lowered to permit the cut block to be conveyed away from said cutting means.

11. Log cutting apparatus as defined in claim 10 wherein said power cutting means is of a bucking saw type.

12. Log cutting apparatus as defined in claim 10 wherein said log waste kick means comprises a pivotal member located on at least one side of said cutting means, said member being operable to be pivoted into contact with log waste to force same from said conveyor.

13. Log cutting apparatus as defined in claim 10 comprising further:
(g) a cut block stop means located adjacent an end of said second conveyor; and
(h) cut block kick means located adjacent said cut block stop means, said cut block stop means being operable to remove cut blocks from in front of said cut block stop means.

14. Log cutting apparatus as defined in claim 13 wherein said cut block stop means has an impact switch means associated therewith, said switch means being operably associated with said cut block kick means to actuate same for removal of said cut blocks.

15. Log cutting apparatus as defined in claim 10 wherein said top clamp member comprises a plate having a pair of diverging legs, and said bottom clamp member comprises a pair of plates, each having diverging legs on opposite sides thereof.

16. Log cutting apparatus as defined in claim 15 wherein a vertically oriented graduated scale is provided adjacent said clamp means, the position of said clamp means indicating a diameter measurement of a log being held therein.

17. A log cutting clamp comprising:
(a) a framework;
(b) a first clamp member mounted on said framework for movement into and out of engagement with logs fed thereto, said clamp member having bifurcated legs for receivably engaging an under-surface of logs of different diameter;
(c) a second clamp member mounted on said frame on a side thereof opposite from said first clamp member, said second clamp member having bifurcated legs for engaging an upper surface of logs of different diameter;
(d) at least one graduated scale located adjacent said clamp members, a portion of one of said clamp members residing adjacent said graduated scale whereby log diameters are indicated at least in part thereon; and
(e) means for moving said clamp members into and out of engagement with logs of different diameter fed therebetween.

18. A log cutting clamp as defined in claim 17 wherein said clamp members are operated by air cylinders.

19. A log cutting clamp as defined in claim 17 wherein a further graduated scale is provided on said first clamp member to permit log diameter determination when said first clamp member is moved upwardly more than a predetermined amount.

20. A log cutting clamp as defined in claim 17 wherein one of said clamp members is vertically offset from said other of said clamp members.

21. A log cutting clamp as defined in claim 17 wherein said first clamp member is a bottom log support and comprises a pair of spaced apart plates, each plate having a V shaped upper end for receiving logs of different diameters therein, and wherein each of said plates is located on an opposite side of a line along which a power cutting means will sever said log.

* * * * *

UNITED STATES PATENT AND TRADEMARK OFFICE
CERTIFICATE OF CORRECTION

PATENT NO. : 4,170,911

DATED : October 16, 1979

INVENTOR(S) : Thomas A. Ayers, Peter T. Ayers

It is certified that error appears in the above-identified patent and that said Letters Patent are hereby corrected as shown below:

Column 4, line 67, "fruther" should read --further--.

Column 9, line 59 (in claim 1), "befurcated" should read --bifurcated--.

Column 10, lines 1 and 2 (in claim 1), "the apparatus" should read --said power cutting means and log path of travel--.

Signed and Sealed this

Twenty-ninth Day of January 1980

[SEAL]

Attest:

SIDNEY A. DIAMOND

Attesting Officer     Commissioner of Patents and Trademarks